United States Patent [19]

Kister et al.

[11] Patent Number: 4,782,706

[45] Date of Patent: Nov. 8, 1988

[54] HOLDING DEVICE FOR MOUNTING AN ELECTRIC TRANSDUCER

[75] Inventors: Horst Kister, Wehrheim; Jean-Francois Schwab, Schmitten; Michael Quenzer; Klaus Schult, both of Frankfurt am Main; Hans-Norbert Patzig, Bad Homburg, all of Fed. Rep. of Germany

[73] Assignee: VDO Adolf Schindling AG, Frankfurt am Main, Fed. Rep. of Germany

[21] Appl. No.: 12,443

[22] Filed: Feb. 9, 1987

[30] Foreign Application Priority Data

Feb. 8, 1986 [DE] Fed. Rep. of Germany ....... 3604030

[51] Int. Cl.$^4$ ................................................ G01B 7/24
[52] U.S. Cl. .......................................... 73/779; 73/65;
73/855; 177/136
[58] Field of Search ................... 73/65, 779, 781, 855,
73/862.54; 177/136

[56] References Cited

U.S. PATENT DOCUMENTS 3,521,484 7/1970 Dybvad et al. ................. 177/136 X
4,269,070 5/1981 Nelson et al. .

Primary Examiner—Charles A. Ruehl
Attorney, Agent, or Firm—Martin A. Farber

[57] ABSTRACT

A holding device for mounting a shear strain gauge 14 in an airplane axle 1 in which the shear strain gauge 14 consists of a coil part 18 with two magnet coils 19 spaced apart from each other and of a disk part 20. The disk part 20 has a disk 21 which, in normal position, extends equidistant between the magnet coils 19. The holding device has two holding rings 16 and 17 arranged axially at a given distance from each other, the coil part being adapted to be fastened to the one holding ring 16 thereof and the disk part 20 to the other holding ring 17. The holding rings 16 and 17 are developed with radial resilience and with a smaller outside diameter than the inside diameter of the airplane axle. They have radially protruding holding lugs 23 which rest under initial spring tension against the inner wall of the airplane axle 1. The holding rings 16 and 17 have support parts 28 and 28', the coil part 18 being adapted to be fastened to the support part 28' of the one holding ring 16 and the disk part 20 to the support part 28 of the other holding ring 17.

30 Claims, 9 Drawing Sheets

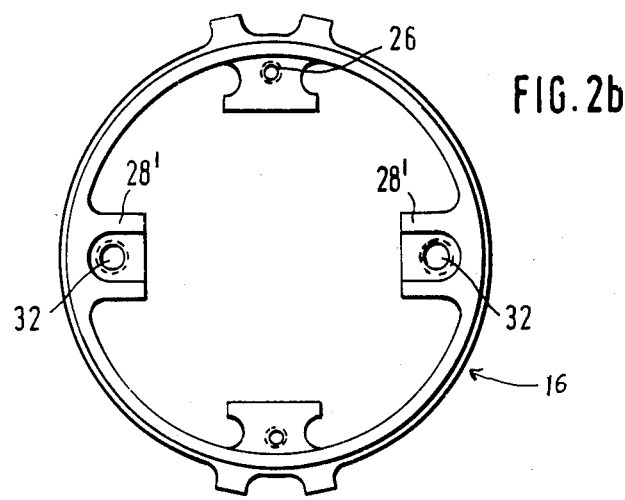
FIG. 2b
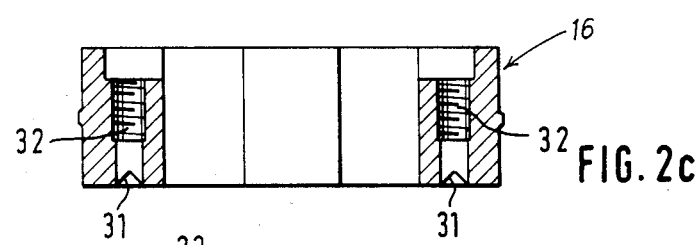
FIG. 2c
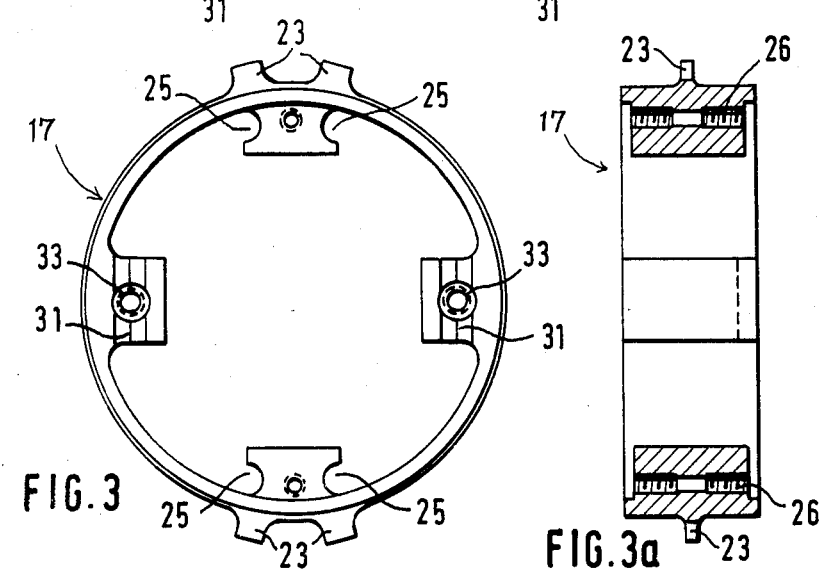
FIG. 3
FIG. 3a

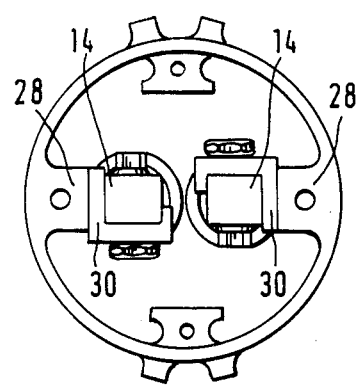
FIG. 6c
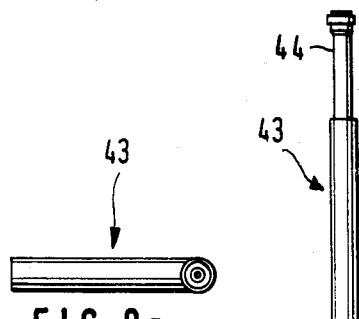
FIG. 8a
FIG. 8
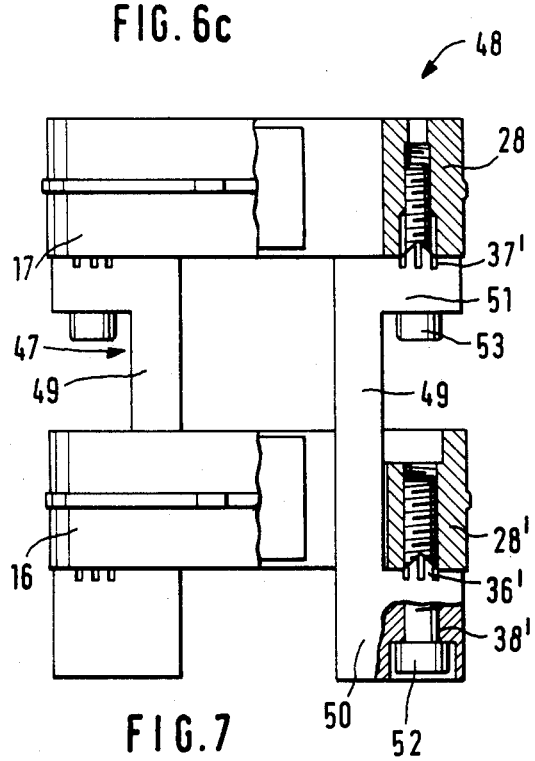
FIG. 7
FIG. 8b
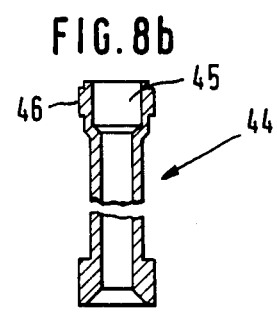
FIG. 8c

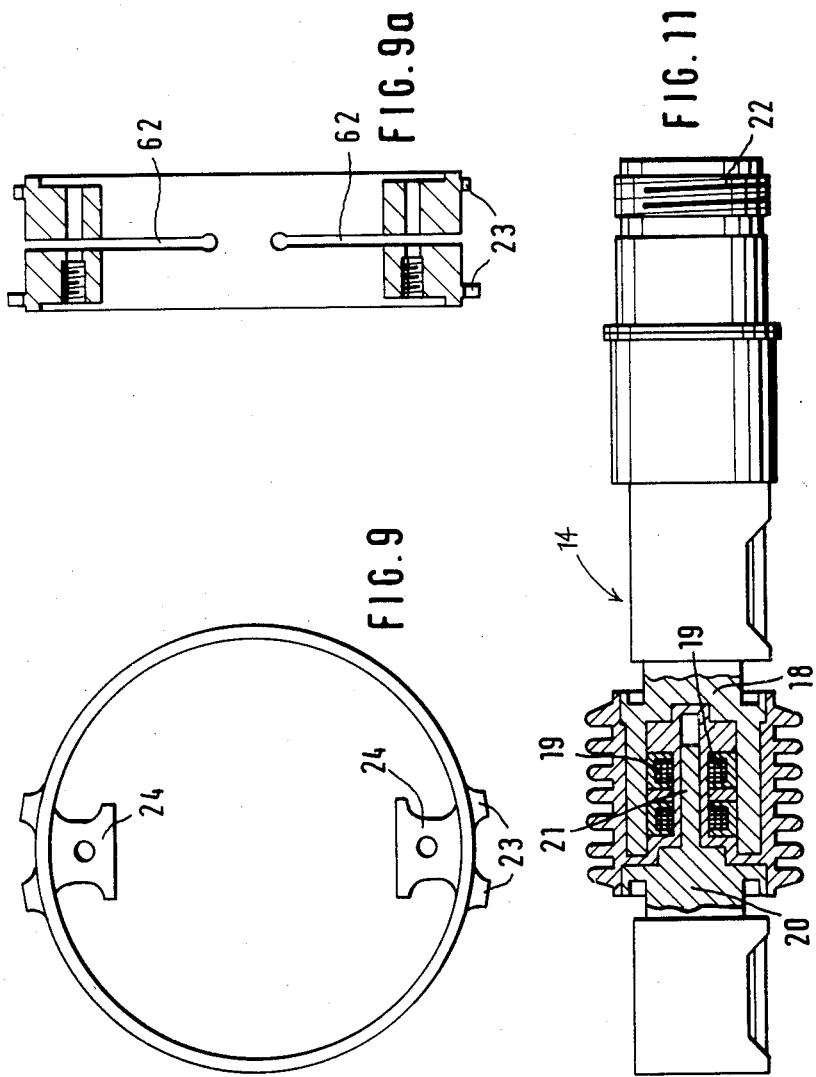

HOLDING DEVICE FOR MOUNTING AN ELECTRIC TRANSDUCER

FIELD AND BACKGROUND OF THE INVENTION

The present invention refers to a holding device for the mounting of an electric transducer, particularly a shear-strain gauge, within a tubular construction part, particularly an airplane axle, the transducer consisting of a coil part having two magnet coils spaced apart from each other and of a disk part which has a disk which in normal position extends equidistantly between the magnet coils, with two holding rings arranged at a given distance axially from each other, the coil part being adapted to be fastened to one holding ring and the disk part being adapted to be fastened to the other holding ring.

Such shear-strain gauges are known from U.S. Pat. No. 4,269,070. They serve for installation in an axle of an aircraft in order to detect the deformation of the axle there. Strain values determined thereby are required for determining the weight and the center of gravity of the aircraft. In this way, optimum loading can, in particular, be effected.

In the case of one known holding device in accordance with the generic concept, the shear-strain gauge is held by holding rings in the airplane axle which is developed as a tubular structural part, radially directed screw bolts arranged on the holding rings being screwed in until they rest against the inner wall of the airplane axle.

This development requires a complicated method of installation and an adjustment which can be carried out only with difficulty.

SUMMARY OF THE INVENTION

It is an object of the invention, therefore, to create a holding device in accordance with this generic concept which, while being of simple construction, can be easily installed and can be adjusted in uncomplicated manner.

According to the invention, the holding rings (16, 17) are developed with radial resilience and with a smaller outside diameter than the inside diameter of the tubular structural part (1) and they have radially protruding holding lugs (23) which can rest under initial spring tension against the inner wall of the tubular structural part (1), and the holding rings (16, 17) have support parts (28, 28'), the coil part (18) being adapted to be fastened to the support part (28) of the one holding ring (17) and the disk part (20) being adapted to be fastened to the support part (28') of the other holding ring (16).

The holding rings are thus held in the tubular structural part in simple manner solely by the radial tension with which they rest resiliently against the inner wall of the tubular structural part. This radial tension can be changed by changing the size of the holding extensions.

The support parts (28, 28') which serve for the attachment are preferably developed on the holding rings (16, 17), so that they can be machined together with the holding rings without any great problems as to tolerance.

Coil part (18) and/or disk part (20) can thus be adapted to be fastened in favorable manner on the holding ring (16, 17) by a screw fastening.

In order to be able to effect a pre-assembly before fastening the transducer on the holding rings which have already been installed separately into the tubular structural part, the coil part (18) and/or disk part (20) can be fastened to a support element (29, 30) which can be connected to the holding ring (16, 17).

If a guide groove (31) which extends transversely to the longitudinal dimension of the tubular structural part (1) and into which a correspondingly developed guide extension (36, 36') of the support element (29, 30) can be engaged is developed on the holding ring (16, 17) then, in this way, substantial adjustment is already obtained in this way upon the attachment of the support element to the holding ring which has already been installed.

For this purpose, guide groove (31) and guide extension (36, 36') are preferably of V-shaped cross section.

If the guide extension (36, 36') has an axial slot (37) which opens outwards towards the bottom of the guide groove (31), then the guide extension can adapt itself to the guide groove, overcoming the manufacturing tolerances.

The guide grooves (31) preferably extend in a plane which is parallel to the longitudinal axis of the tubular structural part (1), said plane extending vertically insofar as possible. In this way the transducer can be adjusted by displacing the support elements in the guide grooves with its lengthwise direction into the horizontally extending neutral plane of bend of the tubular structural part.

For the attachment of the support element (29, 30), a recess (38, 39) extending axially to the longitudinal axis of the tubular structural part (1) can be passed through on same by a fastening screw (40, 41) which can be screwed into a threaded hole (32, 33) of the holding ring (16, 17).

If, in this connection, the recess (38) is a hole of larger diameter than the outside diameter of the fastening screw (40), then the support element can also be shifted for the adjustment.

The recess (38) is preferably a slot which extends in the same direction as the guide groove (31).

An adjustment by vertical displacement of a support element into the neutral plane of bend is possible in simple fashion in the manner that the support element (29) is provided on its side facing away from the guide extension (36) in the region of the recess (38) with stops (42) which extend transversely to the length of the guide extension (36). If on the screw head of the fastening screw, which has already been screwed in up to the stop, a tubular tool is placed whose outer contour is developed eccentrically and rests against the stops, then displacement of the support element is effected by turning said tool.

In order to be able to mount the support elements without any problems after the holding rings have already been mounted, the support elements (29, 30) of both holding rings (16, 17) are arranged on the end sides of the holding rings (16, 17) facing a mouth opening (5) of the tubular structural part (1) which forms a mounting opening.

For this purpose, it is particularly favorable if the threaded hole (32) of that holding ring (16) which is closer to the mounting opening be a continuous hole whose inside diameter is greater than the largest outside diameter of a wrench by which the fastening screw (34) of that holding ring (17) which is further from the mounting opening can be screwed. This development makes it possible in simple manner to screw the support elements tight from the mounting opening by first of all tightening that fastening screw which is further from the mounting opening by means of a wrench which extends in a continuous hole of that holding ring which is closer to the mounting opening. Thereupon the fastening screw on the holding ring which is closer to the mounting opening is also tightened from the mounting opening As fastening screws (40, 34) Allen screws are particularly suitable.

If the holding rings (16, 17) have at least two holding lugs (23) which are diametrically opposite each other, the holding lugs (23) being shifted about 90° to the support parts (28, 28'), then the position of the holding rings in the tubular structural part is unequivocally defined in simple manner.

A shift in position of the holding rings by a bending of the tubular structural part which is to be detected is avoided in the manner that the holding lugs (23) are webs of slight axial length.

In order to deform the holding rings resiliently radially inwards in the region of the holding lugs for assembly, the holding rings (16, 17) can have radially inward extending grip extensions (24) in the region of the holding lugs (23). These grip extensions (24) are particularly easily grasped if they have undercut recesses (25). The recesses (25) of the grip extensions (24) can be preferably engaged behind by radially inwardly movable clamping jaws (58, 58') of a clamping device (54).

Such a clamping device for the radially inward clamping of the holding rings of a holding device of the type described above can have two clamping jaws (58, 58') which are movable radially towards each other and are provided at their radially outward directed ends with gripping hooks (60) which are arranged approximately in circumferential direction and by which the circular extensions (grip extensions 24) of the holding rings (16, 17) can be gripped behind. In this connection, the clamping jaws (58, 58') are preferably movable parallel to each other.

In order to obtain a symmetrical action of force on the grip extensions, one can arrange between two clamping jaws (58), which are movable in the same direction, a clamping jaw (58') which is movable in opposite direction.

If two synchronously movable clamping devices which form a structural unit are arranged at a distance between their clamping jaws (58, 58') which corresponds to the axial spacing of the holding rings (16, 17) then both holding rings can be installed simultaneously into the tubular structural part.

In order that the holding rings can be installed in simple manner at the correct distance from the mounting opening of the tubular structural part, the clamping device can have a stop (61) which limits the movement of introduction of the clamping device into the tubular structural part (1).

In order that the holding rings can be installed in the tubular structural part in correct position with respect to each other, an installation template for installing the holding rings of a holding device of the above-described type into a tubular structural part can be developed in such a manner that the holding rings (16, 17) can be connected by the installation template (47) corresponding to their installation length so as to form an assembly unit (48) correctly associated with each other. For this purpose the installation template (47) preferably has two fastening extensions (50, 51) which are connected to each other and can be detachably fastened to the sides of the holding rings (16, 17) facing the mounting opening (assembly unit 48) of the tubular structural part (1). The installation template (47) can preferably be fastened to two support parts (28, 28') of the holding rings (16, 17) which are associated axially with each other.

If the installation template (47) is provided with guide extensions (36') corresponding to the guide extensions (36) of the support elements (29, 30) and can be fastened to the holding rings (16, 17) by means of fastening screws (52, 53) which can be screwed into the threaded holes (32, 33) of the holding rings (16, 17), then disassembly of the installation template can be effected after the insertion of the holding rings in the same manner as the assembling of the support elements is effected.

Correct installation is particularly simple if the assembly unit can be arranged on the clamping device and introduced together with the latter into the tubular structural part.

BRIEF DESCRIPTION OF THE DRAWINGS

With the above and other objects and advantages in view, the present invention will become more clearly understood in connection with the detailed description of a preferred embodiment, when considered with the accompanying drawings, of which:

FIG. 2b is a rear view of the holding ring of FIG. 2;

FIG. 2c is a top view in, section of, the holding ring of FIG. 2;

FIG. 3 is a front view of an inner holding ring;

FIG. 3a is a side view, in section, of the holding ring of FIG. 3;

FIG. 4c is an enlarged portion of the support element of FIG. 4a;

FIG. 5c is an enlarged portion of the support element of FIG. 5a;

FIG. 6a is a front view of the holding device of FIG. 6;

FIG. 6b is a front view of the holding device of FIG. 6a;

FIG. 6c is a rear view of the holding device of FIG. 6a;

FIG. 7 is an assembly unit, consisting of installation template and holding rings, seen in half section;

FIG. 8 is an adjustment tool, seen in front view;

FIG. 8a is the adjustment tool of FIG. 8, in top view;

FIG. 8b is an enlarged sectional view of the head of the adjustment tool of FIG. 8;

FIG. 8c is a top view of the head of FIG. 8b;

FIG. 9 is a view of a cable guide ring;

FIG. 9a is a side view of the cable guide ring of FIG. 9, seen in section;

FIG. 11 is a side view of a shear strain gauge.

DETAILED DESCRIPTION OF THE PREFERRED EMBODIMENT

Figure 1:
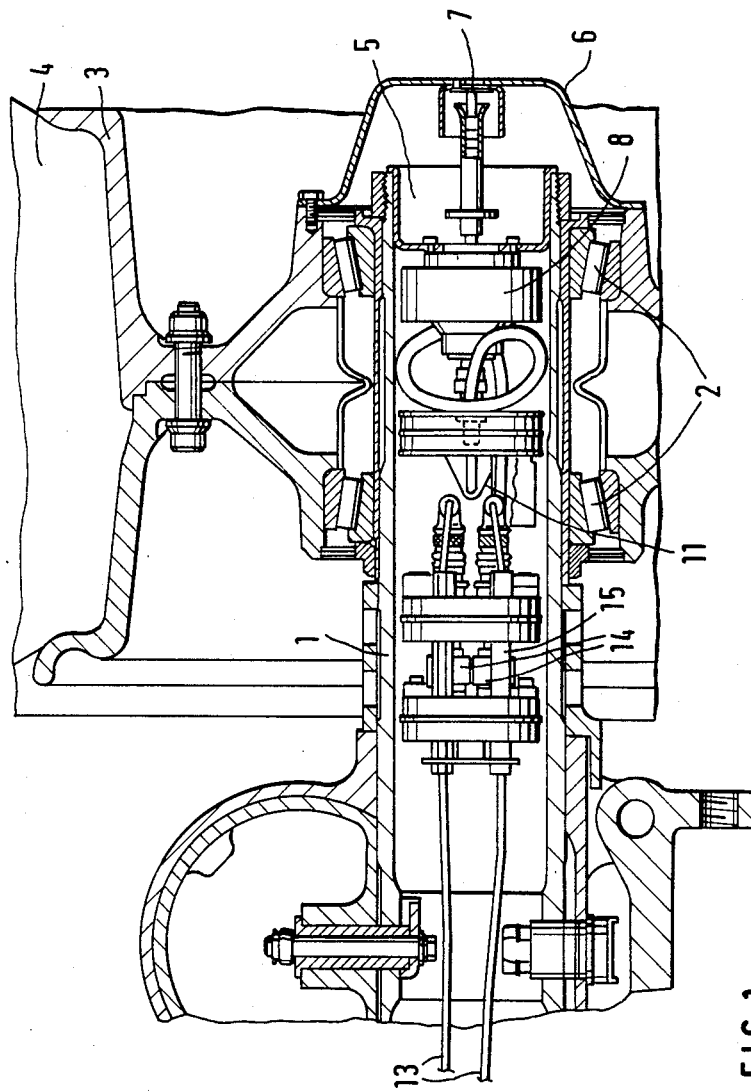
FIG. 1 is a cross section through a view of an airplane axle.
Figure 1A:
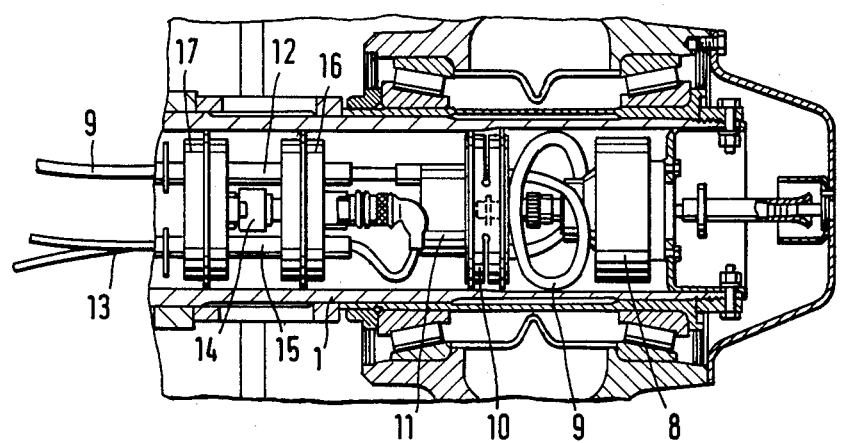
FIG. 1a is a cross section through a top view of the airplane axle of FIG. 1.

FIGS. 1 and 1a show a half of an airplane axle 1 for the nose wheel of an airplane. The rim 3 of a wheel 4 is turnably mounted on this tubular airplane axle via anti-friction bearing 2. On the outer end side of the rim 3 there is fastened a drive cap 6 which covers the outer mouth opening 5 and which has a drive pin 7 which extends coaxially into the guide axle 1. By means of this drive pin 7 a tachogenerator 8 which is arranged fixed against rotation in the aircraft axle 1 can be driven.

The connecting cable 9 of the tachogenerator 8 is prevented, by a cable guide ring 10 and a protector plate 11 borne by the latter, from placing itself in uncontrolled manner against a shear strain measuring system arranged in the inner region of the airplane axle 1 alongside the cable guide ring 10.

Both by the guidance of the cable guide ring 10 and by a guide tube 12 which is passed axially through the shear strain measuring arrangement, the connecting cable is conducted to the central region of the airplane axle 1 without it being possible to influence the measured values of the shear strain measuring arrangement.

In the same way, the connecting cables 13 of the shear strain gauge 14 of the shear strain measuring arrangement are conducted through this axially extending protector tube 15 to the inside of the airplane axle 1.

The shear strain gauges 14 are held in the airplane axle 1 by means of a holding ring 16 which is closer to the mouth opening 5 and a holding ring 17 which is at a given distance therefrom and further away from the mouth opening 5. The two shear strain gauges 14 extend axially alongside of each other in the horizontal neutral plane of bend of the airplane axle 1 so that they are not deflected vertically out of their zero position when the landing gear is not under load.

FIG. 11 shows such a shear strain gauge 14. It consists of a coil part 18 which can be fastened to the holding ring 16 and has two magnet coils 19 which are spaced apart from each other and a disk part 20 which has a disk 21 which in unloaded normal position is equidistant between the magnet coils 19. The coil part 18 also has a cable connection 22 for the connecting of the connecting cable 13.

Figure 2:
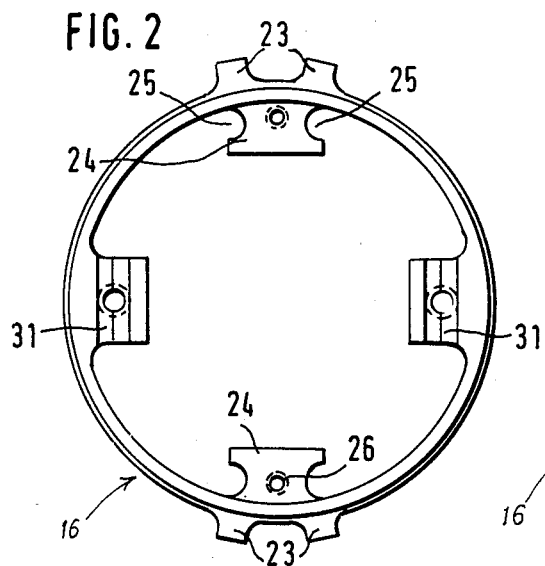
FIG. 2 is a front view of an outer holding ring.
Figure 2A:
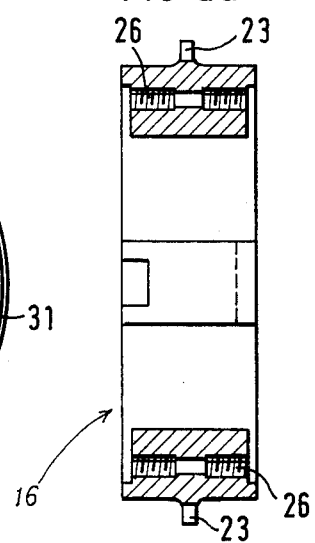
FIG. 2a is a side view, in section, of the holding ring of FIG. 2.
Figure 3B:
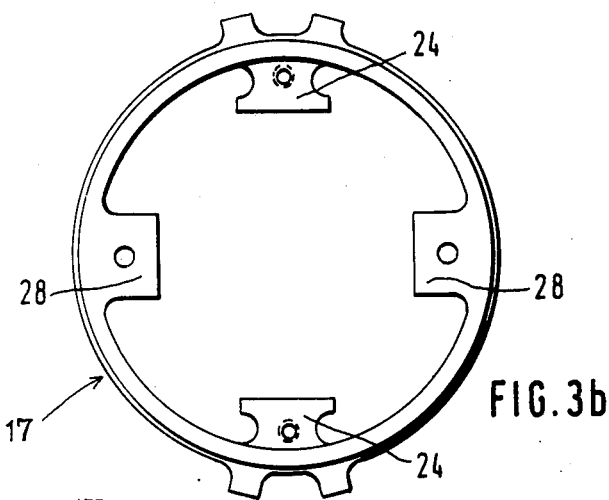
FIG. 3b is a rear view of the holding ring of FIG. 3.
Figure 3C:
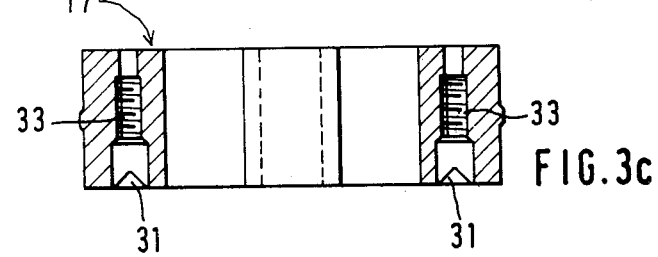
FIG. 3c is a top view, in section, of the holding ring of FIG. 3.
Figure 4:
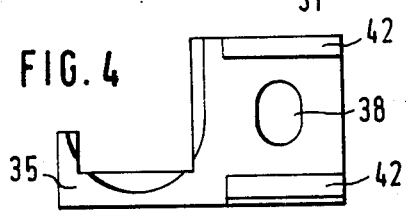
FIG. 4 is a front view of an outer support element.
Figure 4A:
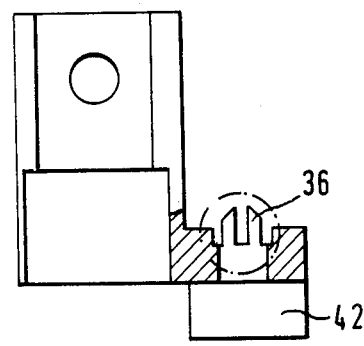
FIG. 4a is a top view of the support element of FIG. 4.
Figure 4B:
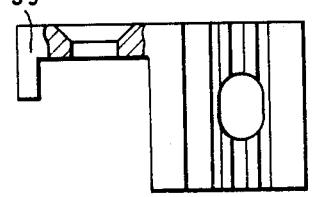
FIG. 4b is a rear view of the support element of FIG. 4.
Figure 4C:
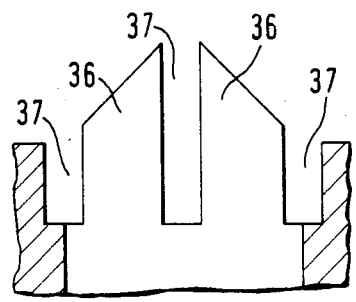
Figure 5:
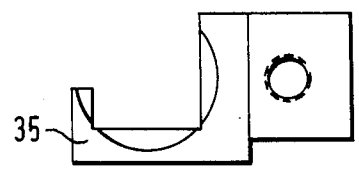
FIG. 5 is a front view of an inner support element.
Figure 5A:
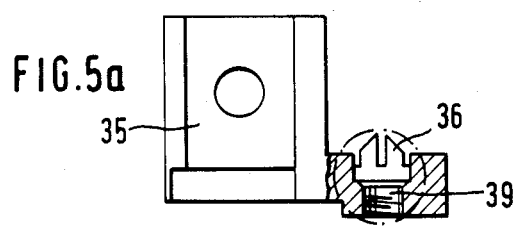
FIG. 5a is a top view of the support element of FIG. 5.
Figure 5B:
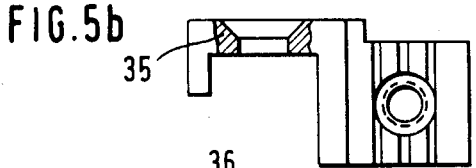
FIG. 5b is a rear view of the support element of FIG. 5.
Figure 5C:
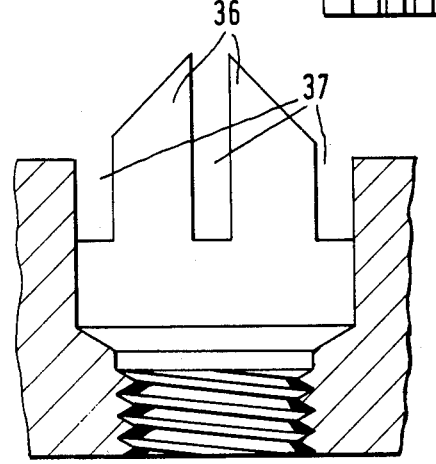

The holding ring 16 is shown on a larger scale in FIGS. 2 to 2c and the holding ring 17 is shown on a larger scale in FIGS. 3 to 3c.

Both holding rings 16 and 17 are radially resilient and have radially protruding holding lugs 23. The latter are arranged in two vertically diametrically opposite groups of two holding lugs 23 each. They are formed by arms of slight axial length. The diameter measured over the holding lugs 23 is somewhat greater than the inside diameter of the airplane axle so that the holding rings 16 and 17 which bear the shear strain gauge 14 are held under initial spring tension in the airplane axle 1.

Radially inwardly directed and opposite each other the holding rings 16 and 17 have grip extensions 24 developed in the region of the holding lugs 23 with recesses 25, which can be gripped behind. These recesses 25 can be gripped behind by clamping jaws of a clamping device, shown in FIG. 10, and the holding rings 16 and 17 are thus elastically radially inwardly deformable for insertion into the airplane axle.

In the grip extensions 24 there are furthermore axial threaded holes 26 for the fastening of holding plates which bear the guide tube 12 as well as the protective tubes 15.

Shifted 90° away from the holding lugs 23, the holding rings 17 and 16 also have radially inwardly directed support parts 28 and 28' developed thereon. On these support parts 28 and 28', support elements 29 and 30 can be fastened by screw attachments, as shown in FIGS. 4 to 4c and 5 to 5c, they, in their turn, bearing the coil parts 18 and disk parts 20.

The support parts 28 and 28' are provided on their sides facing the mouth opening 5 with guide grooves 31 of V-shaped cross section which extend vertically transverse to the lengthwise direction of the airplane axle 1.

Furthermore, the support parts 28 and 28' are provided with continuous threaded holes 32 and 33 which are developed axially to the airplane axle 1 and centrally to the guide grooves 31. The inside diameter of the threaded hole 32 is sufficiently large that a wrench, in particular an Allen wrench, can be passed from the mouth opening 5 through the threaded hole 32 in order to tighten or loosen the Allen screws 34 which fasten the support elements 30 to the support part 28.

The support elements 29 and 30 have holding pedestals 35 on which the coil parts 18 and the disk parts 20 can be screwed fast in their correct position already before installation into the holding rings 16 and 17 which have already been inserted in the airplane axle 1.

At their regions which can be connected with the support parts 28 and 28' in the region of the guide grooves 31, the support elements 29 and 30 have guide extensions 36 of V-shaped cross section which are developed in a manner corresponding to the guide grooves 31 and extend into them. These guide extensions 36 have, both centrally and on their side regions, slots 37 extending in the lengthwise direction of the guide extensions 36, said slots opening outwards towards the bottom of the guide groove 31. In that way, the guide extensions 36 are somewhat elastic transverse to their lengthwise dimension and can adapt themselves in centering fashion to the guide groove 31, overcoming the manufacturing tolerances.

Through recesses 38 and 39 which are developed in a manner corresponding to the threaded holes 32 and 33 of the support parts 28 and 28' on the support elements 29 and 30, fastening screws 40 and 34 are passed for the fastening of the support elements 29 and 30 to the support parts 28 and 28'.

The recesses 38 of the support elements 29 are developed as slots with their length corresponding to the lengthwise direction of the guide grooves 31 so that the support element 29 bearing the coil part 28 can be shifted in the guide groove 31. In this way, an adjustment in position to a precise coaxial position of coil part 18 and disk part 20 can be effected.

In order to be able to carry this out in simple manner from the mouth opening with the shear strain gauges 14 already installed, the support element 29 is provided on its side facing away from the guide extension with stops 42 extending coaxial to the recess 38 and transverse to the length of the guide extension.

For this there is suitable an adjustment tool 43, such as shown in FIGS. 8 to 8c. This adjustment tool has a sleeve-like head 44 whose inner bore 45 has a diameter corresponding approximately to the head of the fastening screw 40. The cylindrical outer contour 46 of the head 44 is eccentric to the inner bore 45 and has a diameter which corresponds approximately to the spacing of the stops 42. By placing the head 44 on the head of the fastening screw 40 and turning the adjustment tool 43 around its longitudinal axis, the only slightly tightened support element 29 can be displaced in the guide groove 31. After this, the fastening screw 40 is tightened.

Figure 6:
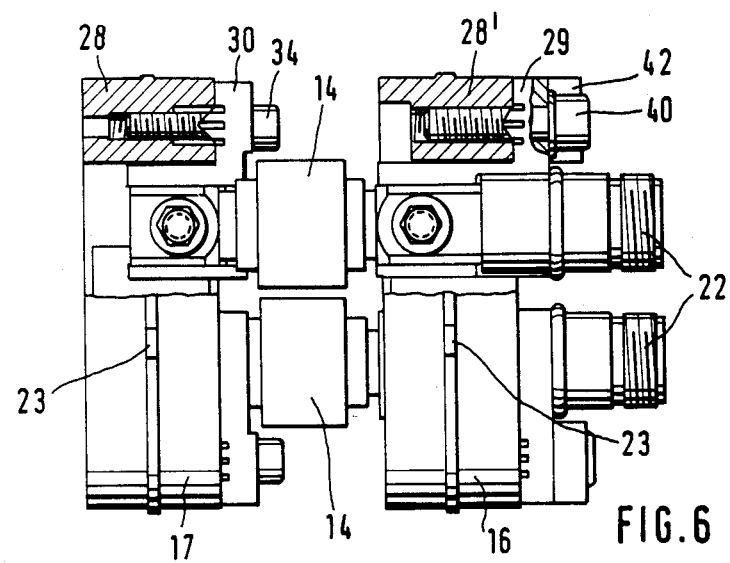
FIG. 6 is a view of the holding device with resistance gauges in half section.
Figures 6A, 6B:
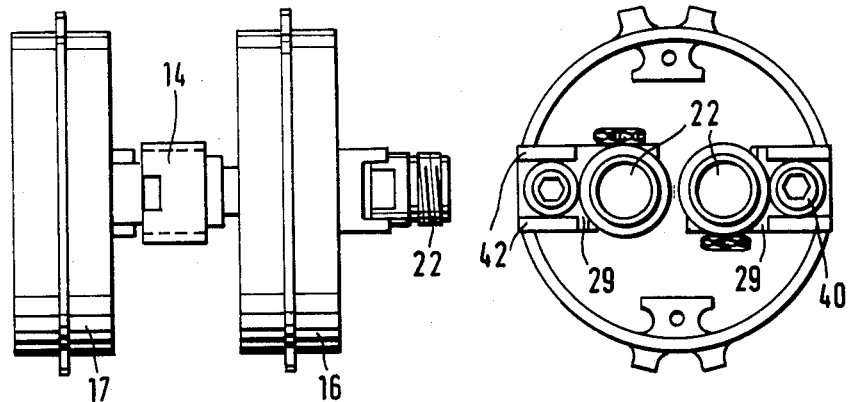

This condition, in which the shear strain gauges 14 are already completely mounted on the holding rings 16 and 17, is shown in FIGS. 6 to 6c.

In order to be able to install the holding rings 16 and 17 in proper position separately from the support elements 29 and 30 and the shear strain gauges 14, the holding rings 16 and 17 are connected by installation templates 47 to form an assembly unit, as shown in FIG. 7.

The installation templates 47 have two fastening extensions 50 and 51 which are connected to each other by an arm 49 which extends through the central recess of the holding ring 16, said fastening extensions being adapted to be fastened by means of fastening screws 52 and 53 to the side of the support parts 28 and 29 facing the mouth opening 5 of the airplane axle 1. The fastening extensions 50 and 51 are developed with the same guide extensions 36', slots 37' and recesses 38' and 39' as the support elements 29 and 30 and also grip via the guide extensions 36' into the guide grooves 31.

Since the fastening screws 52 and 53 also correspond to the fastening screws 40 and 34, disassembly of the installation templates 47 after insertion of the assembly unit 48 into the airplane axle 1 is possible. It is effected, first of all, by loosening the fastening screws 52, then loosening the fastening screws 51 by means of a wrench passed through the threaded hole 32, and then removing the installation template through the central recess in the holding ring 16.

Figure 10:
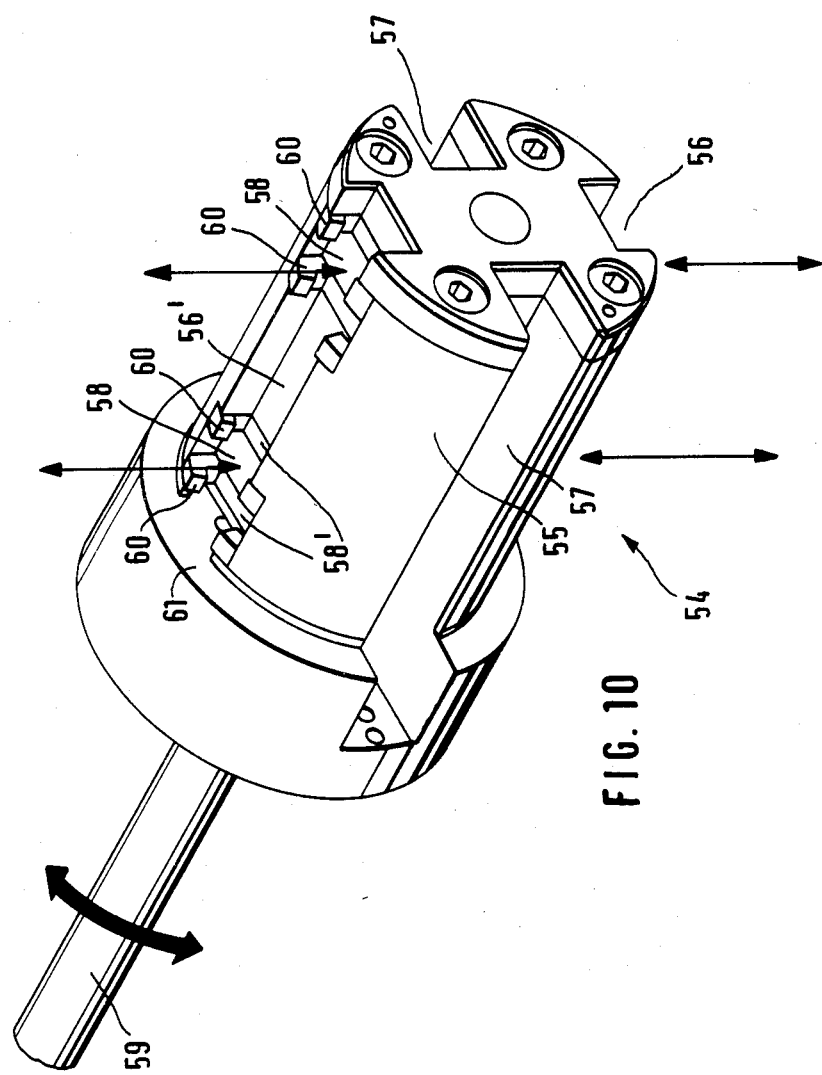
FIG. 10 is a perspective view of a clamping device.

For the installing of the assembly unit 48 into the airplane axle 1 the clamping device 54 shown in FIG. 10 is used. This clamping device 54 has a cylindrical body 55 with two pairs of grooves arranged at right angles to each other, namely clamping grooves 56 and guide grooves 57, which are developed extending axially on the cylindrical outer surface of the body 55. Into the clamping grooves 56 there extend the claw-shaped ends of clamping jaws 58 and 58'. Spaced from the holding rings 16 and 17 there are two groups of clamping jaws 58 and 58' consisting in each case of three clamping jaws 58 and 58' which are movable radially parallel to each other. By means of a rotary drive 59, the inner clamping jaws 58 are movable in opposite direction to the outer clamping jaws 58'. The clamping jaws 58 are provided at their end extending into the lower clamping groove 56 with gripping hooks 60, not shown, while the clamping jaws 58' have gripping hooks 60 at the end thereof extending into the upper clamping groove 56'.

By the lateral pushing-on of the assembly unit 48 onto the cylindrical body 55, in which connection the arms 49 are guided in the guide grooves 57 and the gripping extensions 24 in the clamping grooves 56 and 56', the gripping hooks 60 come into engagement in the recesses 25.

The lateral pushing-on is effected until the end sides of the arms 48 come against the axial ends of the guide grooves 57. By turning the rotary drive 59, the clamping jaws 58 and 58' are moved radially inward and the holding rings 16 and 17 are elastically deformed in such a manner that the mounting unit 48 can be introduced with the clamping device 54 into the airplane axle 1. This takes place until the radial widening of the cylindrical body 55 which forms a stop at 61 comes against the mouth opening 5. In this way, the exact positioning of the holding rings 16 and 17 in the airplane axle 1 is reached. By turning the rotary drive 59 backward and axially pulling the clamping device 54 out of the airplane axle 1, the assembly unit 48 is installed. There is now effected the removal as described above of the installation template 47 and the installation of the shear strain gauge 14, provided with the support elements 29 and 30, from the mouth opening 5.

The cable guide ring 10 shown in FIGS. 9 and 9a is, in principle, of the same construction and is inserted in the same manner as the holding rings 16 and 17. It also has grip extensions 24 and holding lugs 23. The cable guide ring 10 has holding lugs 23 spaced axially apart in two planes. In order to obtain an uncoupling of the two planes of the holding lugs 23, the cable guide ring 10 is substantially separated by radial slits 62 into two axially adjacent parts rings.

What is claimed is:

1. In a holding device for mounting an electric transducer, particularly a shear-strain gauge, within a tubular structural part, particularly an airplane axle, the transducer including a coil part having two magnet coils spaced apart from each other and a disk part which has a disk which in normal position extends equidistantly between the magnet coils, the holding device comprising two holding rings arranged at a predetermined distance axially from each other, the coil part being secured to a first of the holding rings and the disk part being secured to a second of the holding rings, the improvement wherein both of the holding rings are developed with radial resilience and with a smaller outside diameter than an inside diameter of the tubular structural part, and have radially protruding holding lugs which rest under initial spring tension against an inner wall of the tubular structural part; and wherein each of the holding rings have support parts, the coil part being secured by a support part of said first holding ring and the disk part being secured by a support part of said second holding ring.

2. The holding device according to claim 1, wherein each of said support parts is formed as extensions of respective ones of the holding rings.

3. The holding device according to claim 1, wherein at least one of a set of transducer parts constituting said coil part and said disk part is fastened on a holding ring by a screw fastening.

4. The holding device according to claim 1, further comprising support elements connected by individual ones of said support parts to respective ones of said holding rings: and wherein at least one of a set of transducer parts constituting said coil part and said disk part is fastened via a support element and a support part to a holding ring.

5. The holding device according to claim 4 further comprising a guide groove formed as a part of a holding ring extends transversely to a longitudinal dimension of the tubular structural part; and a correspondingly developed guide extension of said support element, said guide extension being engaged with said guide groove.

6. The holding device according to claim 5, wherein said guide groove and said guide extension have a V-shaped cross section.

7. The holding device according to claim 5, wherein said guide extension has an axial slot which opens outwards towards a bottom of said guide groove.

8. The holding device according to claim 5, wherein said guide groove extends in a plane which is parallel to a longitudinal axis of the tubular structural part.

9. The holding device according to claim 8, wherein said plane extends vertically.

10. The holding device according to claim 4, further comprising a recess on said support element, the recess extending axially along the longitudinal axis of the tubular structural part, the recess admitting passage therethrough of a fastening screw which is screwable into a threaded hole of one of said holding rings.

11. The holding device according to claim 10, wherein the recess is a hole of a larger diameter than the outside diameter of said fastening screw.

12. The holding device according to claim 5, further comprising a recess on said support element, the recess extending axially along the longitudinal axis of the tubular structural part, the recess admitting passage therethrough of a fastening screw which is screwable into a threaded hole of one of said holding rings; and wherein said recess is a slot which extends in the same direction as the guide groove.

13. The holding device according to claim 5, further comprising a recess on said support element, the recess extending axially along the longitudinal axis of the tubular structural part, the recess admitting passage therethrough of a fastening screw which is screwable into a threaded hole of one of said holding rings; and wherein said support element is provided on its side facing away from the guide extension in a region of the recess with stops which extend transversely to the length of the guide extension.

14. The holding device according to claim 4, wherein there are two of said support element, said support elements are on both of said holding rings and are arranged on end sides of the holding rings facing a mouth opening of the tubular structural part which forms a mounting opening.

15. The holding device according to claim 14, further comprising a recess on each of said support elements, the recesses extending axially along the longitudinal axis of the tubular structural part, the recesses admitting passage therethrough of fastening screws which are screwable into threaded holes of said holding rings respectively; and wherein the threaded hole of that one of said holding ring which is closer to the mounting opening is a continuous hole having an inside diameter greater than the largest outside diameter of a wrench by which the fastening screw associated with the holding ring which is further from the mounting opening can be screwed.

16. The holding device according to claim 15, wherein the fastening screws are Allen screws.

17. The holding device according to claim 1, wherein each of said holding rings has at least two holding lugs which are diametrically opposite each other, the holding lugs being shifted about 90° to the support parts.

18. The holding device according to claim 17, wherein the holding lugs are webs of slight axial length.

19. The holding device according to claim 17, wherein the holding rings have radially inwardly extending grip extensions in a region of the holding lugs.

20. The holding device according to claim 19, wherein said grip extensions are formed with undercut recesses to facilitate grasping.

21. The holding device according to claim 20, wherein the recesses of the grip extensions are formed to permit engagement from behind by radially inwardly movable clamping jaws of a clamping device.

22. A clamping device for positioning a holding device which is to hold a transducer, particularly a shear-strain gauge, within a tubular structural part, particularly an airplane axle, the transducer including a coil part having two magnet coils spaced apart from each other and a disk part which has a disk which in normal position extends equidistantly between the magnet coils, the holding device comprising two holding rings arranged at a predetermined distance axially from each other, the coil part being secured to a first of the holding rings and the disk part being secured to a second of the holding rings, the improvement wherein both of the holding rings are developed with radial resilience and with a smaller outside diameter than an inside diameter of the tubular structural part and have radially protruding holding lugs which rest under initial spring tension against an inner wall of the tubular structural part; and wherein each of the holding rings have support parts, the coil part being secured by a support part of said first holding ring and the disk part being secured by a support part of said second holding ring; and wherein said holding rings have circular extensions for gripping, said clamping device providing for radially inward clamping of the holding rings of said holding device;

said clamping device comprising:

two clamping jaws which are movable radially towards each other and are provided at their radially outward directed ends with gripping hooks which are arranged approximately in circumferential direction and by which the circular extensions of the holding rings can be gripped from behind.

23. The clamping device for positioning a holding device according to claim 22, wherein the clamping jaws are movable parallel to each other.

24. The clamping device for positioning a holding device according to claim 22, wherein between two clamping jaws which are movable in the same direction said clamping device further comprises a clamping jaw which is movable in opposite direction.

25. The clamping device for positioning a holding device according to claim 22, further comprising
two synchronously movable clamping devices which form a structural unit and are arranged at a distance apart of their clamping jaws which corresponds to an axial spacing of the holding rings.

26. The clamping device for positioning a holding device according to claim 22, wherein
the clamping device has a stop which limits the movement of introduction of the clamping unit into the tubular structural part.

27. The clamping device for positioning a holding device according to claim 22, further comprising
an installation template for installing the holding rings into a tubular structural part wherein the holding rings are connected by the installation template corresponding to their installation length so as to form an assembly unit correctly associated with each other.

28. The clamping device for positioning a holding device according to claim 27, wherein
the installation template has two fastening extensions which are connected to each other and detachably fastenable to sides of the holding rings facing a mounting opening of the tubular structural part.

29. The clamping device for positioning a holding device according to claim 27, wherein
the installation template is fastenable to two support parts of the holding rings which are associated axially with each other.

30. The clamping device for positioning a holding device according to claim 27, wherein
the holding rings have support elements extending therefrom and being formed with guide extensions; and wherein
said installation template has guide extensions corresponding to said guide extensions of the support elements and are fastenable to the holding rings by means of fastening screws screwable into threaded holes of the holding rings.

* * * * *